(12) United States Patent
Wang et al.

(10) Patent No.: US 11,943,807 B2
(45) Date of Patent: *Mar. 26, 2024

(54) TWO STEP RANDOM ACCESS PROCEDURE

(71) Applicant: QUALCOMM Incorporated, San Diego, CA (US)

(72) Inventors: Renqiu Wang, San Diego, CA (US); Wanshi Chen, San Diego, CA (US); Hao Xu, Beijing (CN); Hung Dinh Ly, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/458,074

(22) Filed: Aug. 26, 2021

(65) Prior Publication Data

US 2021/0392678 A1 Dec. 16, 2021

Related U.S. Application Data

(63) Continuation of application No. 16/510,649, filed on Jul. 12, 2019, now Pat. No. 11,122,617, which is a (Continued)

(51) Int. Cl.
*H04W 74/00* (2009.01)
*H04W 74/0833* (2024.01)
*H04W 84/04* (2009.01)

(52) U.S. Cl.
CPC ...... *H04W 74/006* (2013.01); *H04W 74/0833* (2013.01); *H04W 84/042* (2013.01)

(58) Field of Classification Search
CPC .................................................. H04W 74/006
(Continued)

(56) References Cited

U.S. PATENT DOCUMENTS 8,547,927 B2 10/2013 Seo et al.
9,215,701 B2 12/2015 Koc et al.
(Continued)

FOREIGN PATENT DOCUMENTS

CN 103391581 A 11/2013
WO 2016171767 A1 10/2016

OTHER PUBLICATIONS

3GPP: "3rd Generation Partnership Project; Technical Specification Group Radio Access Network; Medium Access Control (MAC) protocol specification (Release 13)", 3GPP TS 25.321 V13.2.0, Mar. 31, 2016 (Mar. 31, 2016), pp. 1-213, XP055536653.
(Continued)

*Primary Examiner* — Joel Ajayi
(74) *Attorney, Agent, or Firm* — Sevan Savsa; Loza & Loza LLP

(57) ABSTRACT

Wireless communication devices are adapted to facilitate a random access procedure. According to one example, scheduled entity can transmit a first transmission that is received by a scheduling entity. The first transmission may include a physical random access channel (PRACH) preamble sequence and a first message including information for determining a device-specific network identifier for the scheduled entity. The scheduling entity may transmit a second transmission that is received by the scheduled entity. The second transmission may include information on a physical downlink control channel (PDCCH) addressed to the device-specific network identifier for the scheduled entity, and a second message on a physical downlink shared channel (PDSCH). Other aspects, embodiments, and features are also included.

20 Claims, 10 Drawing Sheets

Related U.S. Application Data continuation of application No. 15/799,357, filed on Oct. 31, 2017, now Pat. No. 10,405,342.

(60) Provisional application No. 62/416,031, filed on Nov. 1, 2016.

(58) Field of Classification Search
USPC .......................................................... 370/329
See application file for complete search history.

(56) References Cited

U.S. PATENT DOCUMENTS

| | | |
|---|---|---|
| 9,300,446 B2 | 3/2016 | Malladi et al. |
| 9,380,601 B2 | 6/2016 | Jeong et al. |
| 10,405,342 B2 | 9/2019 | Wang et al. |
| 2010/0014468 A1 | 1/2010 | Lee et al. |
| 2013/0029657 A1 | 1/2013 | Gao et al. |
| 2013/0083753 A1 | 4/2013 | Lee et al. |
| 2013/0301611 A1 | 11/2013 | Baghel et al. |
| 2014/0219204 A1 | 8/2014 | Park et al. |
| 2015/0110038 A1 | 4/2015 | Yang et al. |
| 2016/0100422 A1* | 4/2016 | Papasakellariou .... H04W 74/08 370/329 |
| 2016/0150564 A1 | 5/2016 | Quan et al. |
| 2016/0219621 A1 | 7/2016 | Kim et al. |
| 2018/0124822 A1 | 5/2018 | Wang et al. |
| 2019/0342913 A1 | 11/2019 | Wang et al. |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP Standard; 3GPP TS 36.321, 3rd Generation Partnership Project (3GPP), Mobile Competence Centre; 650, Route Des Lucioles; F-06921 Sophia-Antipolis Cedex; France, RAN WG2, V14.0.0, Oct. 3, 2016 (Oct. 3, 2016), pp. 1-96, XP051172893.

International Preliminary Report on Patentability—PCT/US2017/059570, The International Bureau of WIPO—Geneva, Switzerland, May 16, 2019.

International Search Report and Written Opinion—PCT/US2017/059570—ISA/EPO—dated Feb. 7, 2018.

Taiwan Search Report—TW106137734—TIPO—dated Mar. 7, 2021.

Samsung: "Linkage between PDCCH and PDSCH/PUSCH with Cross-Carrier Scheduling", 3GPP TSG RAN WG1 #60bis, R1-102166, Beijing, China, Apr. 12-16, 2010, pp. 1-3.

* cited by examiner

TWO STEP RANDOM ACCESS PROCEDURE

PRIORITY CLAIM

The present application for patent is a Continuation of Non-Provisional application Ser. No. 16/510,649, filed in the U.S. Patent and Trademark Office on Jul. 12, 2019, the entire content of which is incorporated herein by reference as if fully set forth below in its entirety and for all applicable purposes. Non-Provisional application Ser. No. 16/510,649 is a Continuation of Non-Provisional application Ser. No. 15/799,357, filed in the U.S. Patent and Trademark Office on Oct. 31, 2017, the entire content of which is incorporated herein by reference as if fully set forth below in its entirety and for all applicable purposes. Non-Provisional application Ser. No. 15/799,357 claims priority to, and the benefit of Provisional Application No. 62/416,031, filed in the U.S. Patent and Trademark Office on Nov. 1, 2016, the entire content of which is also incorporated herein by reference as if fully set forth below in its entirety and for all applicable purposes.

TECHNICAL FIELD

The technology discussed below relates generally to wireless communication systems, and more particularly, to random access procedures in wireless communication systems.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE, which generally corresponds to a fifth generation (5G) network as that term is defined by the next generation mobile networks (NGMN) alliance. As it stands today, this 5G network may exhibit a higher degree of flexibility and scalability than LTE, and is envisioned to support very diverse sets of requirements.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various examples and implementations of the present disclosure facilitate a random access procedure. One or more aspects of the disclosure include wireless communication devices configured to utilize a two-step random access procedure. According to at least one example, scheduling entities may include a transceiver and a memory. A processor may be communicatively coupled to the transceiver and the memory, and may be adapted to receive a first transmission from a scheduled entity for a random access procedure. The first transmission may include a physical random access channel (PRACH) preamble sequence and a first message including information for determining a device-specific network identifier for the scheduled entity. The processor may further be adapted to detect the PRACH preamble sequence and decode the first message. In response to successfully detecting the preamble and decoding the first message of the first transmission, the processor may be adapted to transmit a second transmission including information on a physical downlink control channel (PDCCH) addressed to the device-specific network identifier for the scheduled entity, and a second message on a physical downlink shared channel (PDSCH).

Additional aspects of the present disclosure include methods operational on a scheduling entity and/or means for performing such methods. According to at least one example, such methods may include receiving a first transmission from a scheduled entity for a random access procedure, where the first transmission includes a PRACH preamble sequence and a first message including information for determining a device-specific network identifier for the scheduled entity. The PRACH preamble sequence may be detected and the first message may be decoded. In response to successfully detecting the preamble and decoding the first message of the first transmission, a second transmission may be transmitted. The second transmission may include information on a PDCCH addressed to the device-specific network identifier for the scheduled entity, and a second message on a PDSCH.

Yet additional aspects of the present disclosure include processor-readable storage mediums storing processor-executable programming. In at least one example, the processor-executable programming may be adapted to cause a processing circuit to receive a first transmission from a scheduled entity for a random access procedure, where the first transmission includes a PRACH preamble sequence and a first message including information for determining a device-specific network identifier for the scheduled entity. The processor-executable programming may further be adapted to cause a processing circuit to detect the PRACH preamble sequence and decode the first message. In response to successfully detecting the preamble and decoding the first message of the first transmission, the processor-executable programming may be adapted to cause a processing circuit to transmit a second transmission including information on a PDCCH addressed to the device-specific network identifier for the scheduled entity, and a second message on a PDSCH.

Additional aspects of the disclosure include scheduled entities including a transceiver and a memory. A processor may be communicatively coupled to the transceiver and the memory, and may be adapted to transmit a first transmission for a random access procedure, the first transmission including a PRACH preamble sequence and a first message including information for determining a device-specific network identifier for the scheduled entity. The processor may further be adapted to receive a second transmission including information on a PDCCH addressed to the device-specific network identifier for the scheduled entity, and a second message on a PDSCH.

Methods operational on a scheduled entity and/or means for performing such methods and also disclosed. According to at least one example, such methods may include transmitting a first transmission for a random access procedure, the first transmission including a PRACH preamble sequence and a first message including information for determining a device-specific network identifier for the scheduled entity. Further, a second transmission may be received including information on a PDCCH addressed to the device-specific network identifier for the scheduled entity, and a second message on a PDSCH.

Additional aspects of the present disclosure include processor-readable storage mediums storing processor-executable programming. In at least one example, the processor-executable programming may be adapted to cause a processing circuit to transmit a first transmission for a random access procedure, the first transmission including a PRACH preamble sequence and a first message including information for determining a device-specific network identifier for the scheduled entity. The processor-executable programming may further be adapted to cause a processing circuit to receive a second transmission including information on a PDCCH addressed to the device-specific network identifier for the scheduled entity, and a second message on a PDSCH.

Other aspects, features, and embodiments associated with the present disclosure will become apparent to those of ordinary skill in the art upon reviewing the following description in conjunction with the accompanying figures.

DRAWINGS

DETAILED DESCRIPTION

The detailed description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
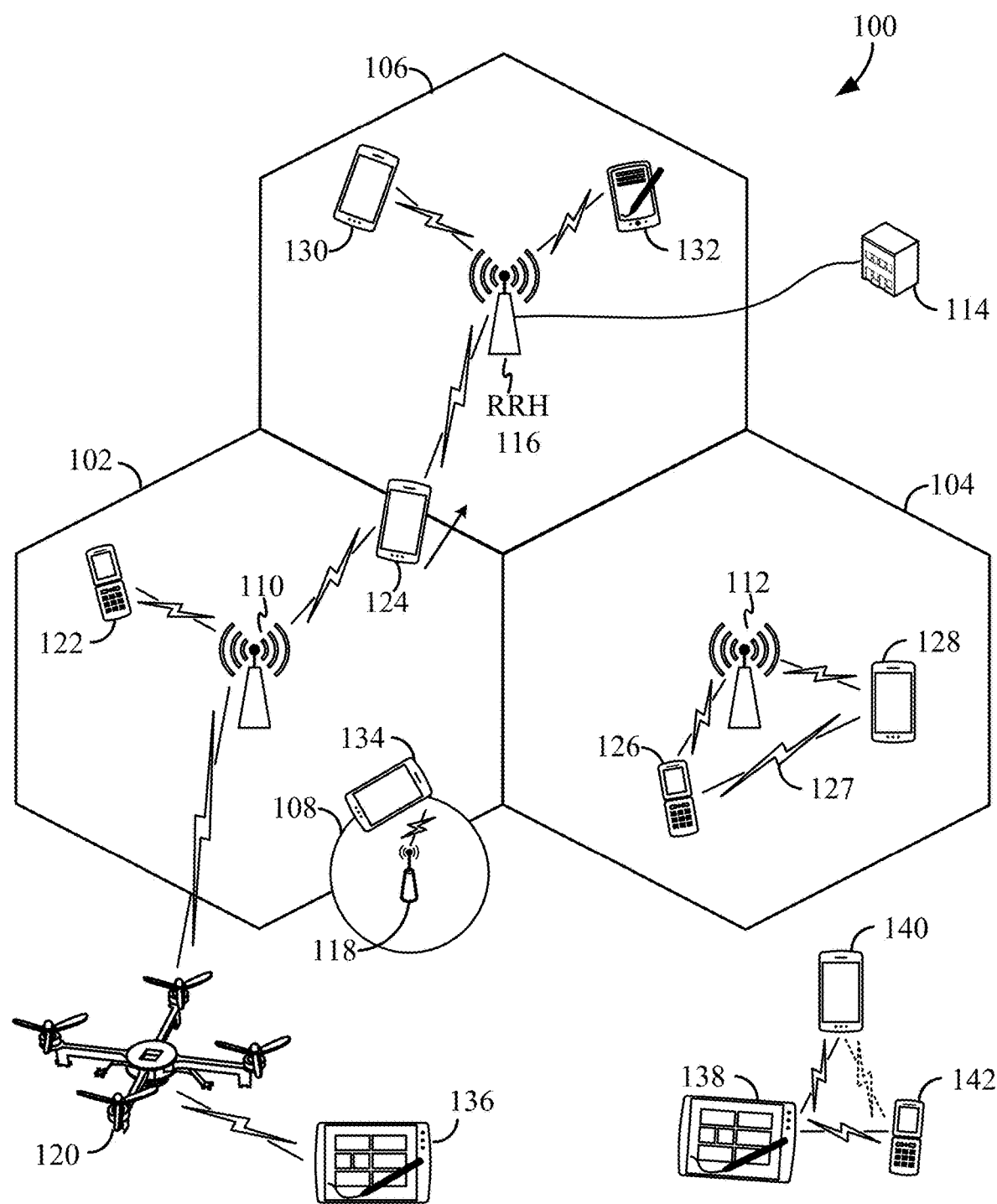
FIG. 1 is a block diagram of a network environment in which one or more aspects of the present disclosure may find application.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, each cell is served by a respective base station (BS). Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two base stations 110 and 112 are shown in cells 102 and 104, and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network, (not shown), and in some examples, the backhaul may provide interconnection between the respective base stations. The core network may be a part of a wireless communication system, and may be independent of the radio access technology used in the radio access network. Various types of backhaul interfaces may be employed, such as a direct physical connection, a virtual network, or the like using any suitable transport network.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110, UEs 126 and 128 may be in communication with base station 112, UEs 130 and 132 may be in communication with base station 114 by way of RRH 116, UE 134 may be in communication with base station 118, and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quad-copter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality, and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
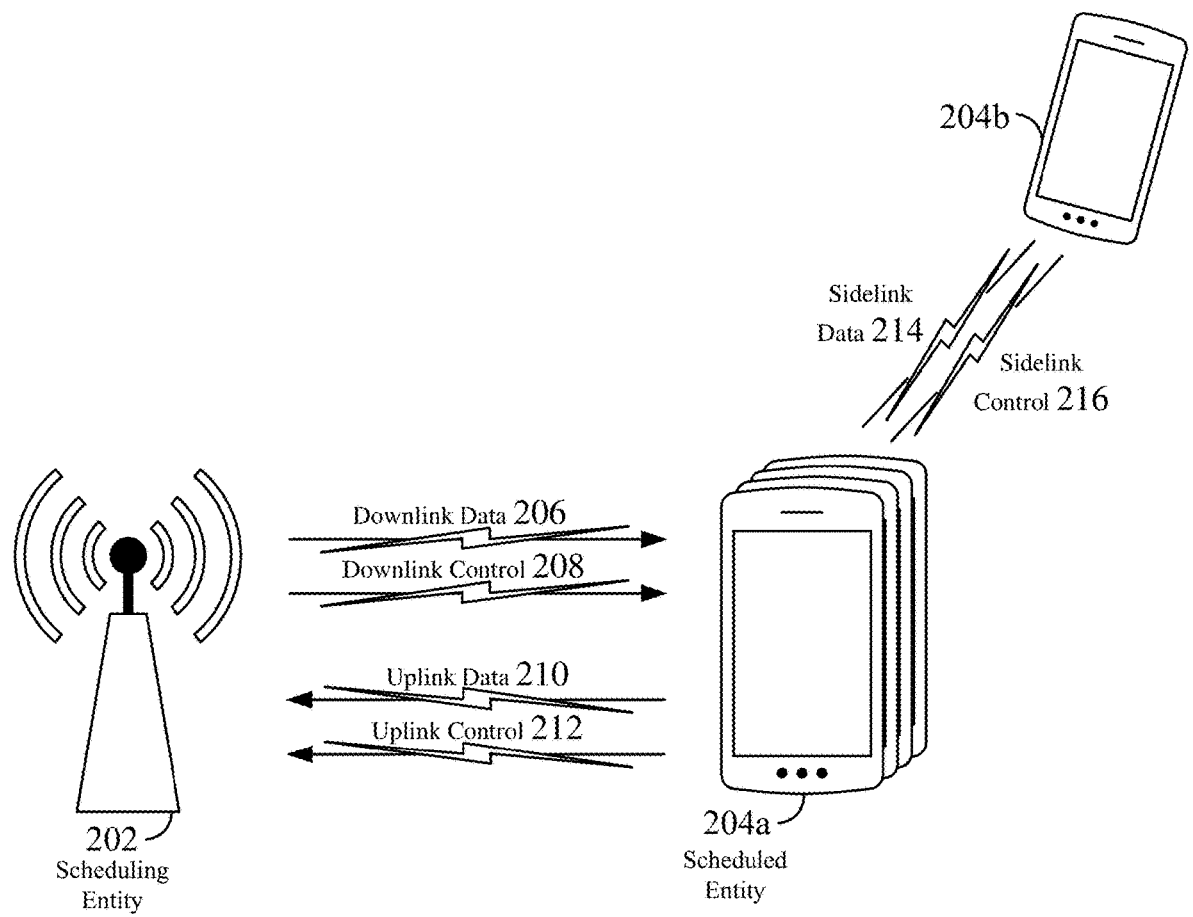
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204*a* and a second scheduled entity 204*b* may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

Figure 3:
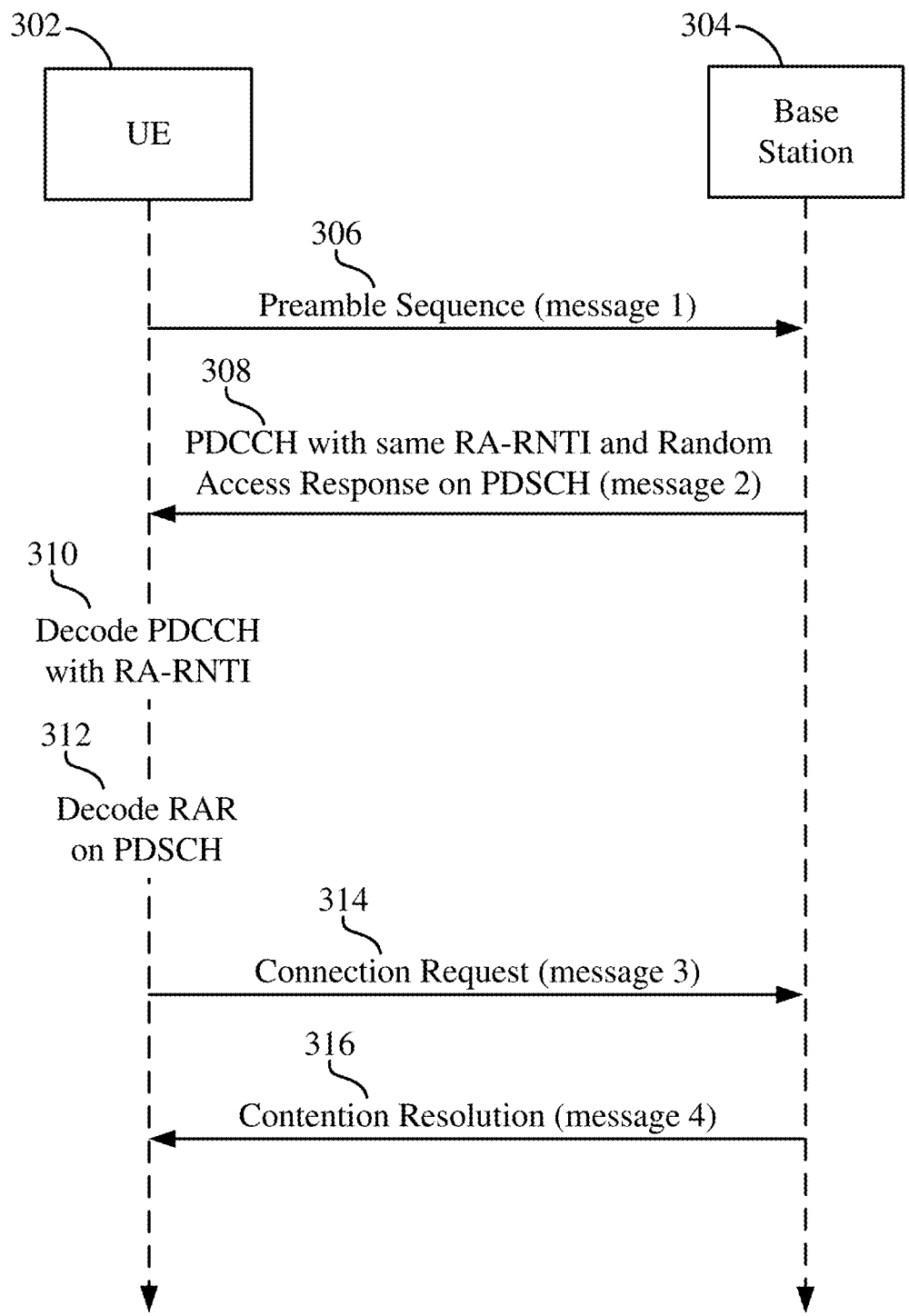
FIG. 3 is a flow diagram illustrating an example of a random access procedure.

As a UE operates in the radio access network 100, the UE may perform a random access procedure with the radio access network 100. A random access procedure is a contention-based channel access procedure that a connected UE may use to obtain and utilize resources for wireless communication. A random access procedure can also be triggered by a handover or initial access to the network. During a conventional random access procedure, a UE and a network entity (e.g., a base station) employ a four-step communication process. For example, FIG. 3 is a flow diagram illustrating an example of a typical random access procedure. Initially, a UE 302 randomly selects a PRACH (physical random access channel) preamble sequence from a set of available preamble sequences and sends a first message 306 on the PRACH at increasing power until the base station 304 detects the preamble. The preamble transmission 306 includes a RA-RNTI (random access radio network temporary identity) that can be determined from the subframe index in which the UE 302 sends the preamble.

In response to detecting the preamble transmitted by the UE 302, the base station 304 sends a second message 308 that includes a transmission on the PDCCH (physical downlink control channel) that can be identified using a RA-RNTI, and a random access response (RAR) transmitted on the PDSCH (physical downlink shared channel). If the UE 302 is able to decode the PDCCH with the RA-RNTI at 310, then the UE 302 attempts to decode the RAR on the PDSCH at 312. Among other things, the RAR includes a random access preamble ID. If the RAR includes a random access preamble ID corresponding to the transmitted random access preamble, the UE 302 considers that random access was successful. In response to decoding the RAR on the PDSCH, the UE sends a third message 314 including an RRC connection request message using PUSCH and PUCCH. This third message 314 may also include a CCCH SDU or a temporary C-RNTI (TC-RNTI).

It is possible that multiple UEs could use the identical preamble sequence to access the system. This will cause the base station 304 to send a PDCCH that includes the same RA-RNTI. Multiple UEs will then detect the RA-RNTI and decode the RAR being sent on PDSCH. All these UEs will detect a Random Access ID match and will send data on the uplink using the same UL resource blocks and the same Time Adjustment. A contention resolution procedure is therefore typically employed at this point.

The base station 304 will only receive the third message 310 from one of the UEs whose time alignment was suitable. The base station 304 first sends a PDCCH with the temporary C-RNTI originally included in the RAR, followed by transmission of the contention resolution message 316 on the PDSCH where the base station 304 includes a contention resolution ID that matches the CCCH SDU of only one of the UEs. The respective UE detects that the contention resolution message 316 was directed toward it, then the UE sends an ACK indicating contention resolution was successful. An alternative to this is when the UE already has a C-RNTI, which it included in PUSCH, the base station 304 resolves contention by just transmitting 316 the PDCCH with C-RNTI and an UL grant as well on the PDCCH.

Figure 4:
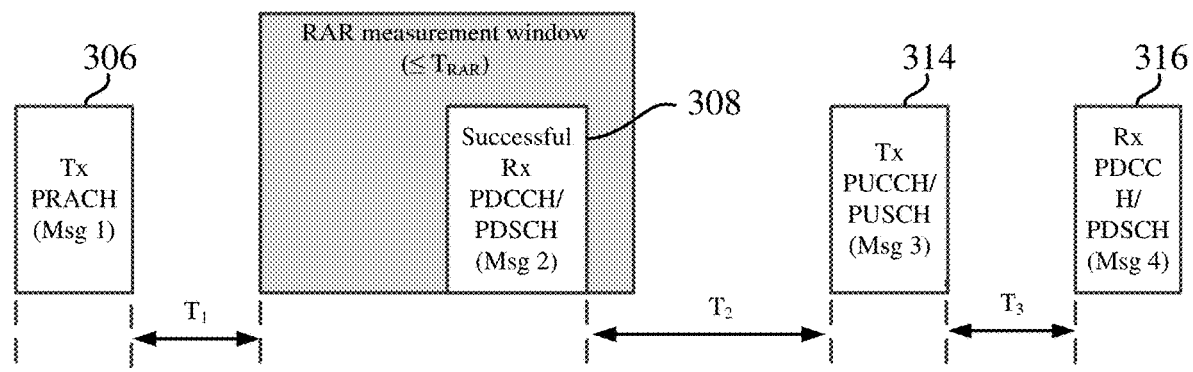
FIG. 4 is a block diagram illustrating an example of delay periods in the random access procedure of FIG. 3.

The above described messaging is also depicted in the block diagram of FIG. 4. As shown, there is a time period between each of the transmissions described above with reference to FIG. 3. For purposes of this disclosure, these time periods are referred to as delay periods. As shown in FIG. 4, there is a first delay period $T_1$ following transmission of the first message 306 until the UE 302 opens a RAR measurement window to monitor for the second message 308 sent from the base station 304. After successfully decoding the PDCCH and the RAR in the PDSCH, a second delay period $T_2$ passes before the UE 302 sends the third message 314, at least in part because of the timing advance value received in the second message 308 that informs the UE to change its timing to compensate for the round trip delay. Additionally, after transmitting the third message 314, there is a third delay period $T_3$ before the UE receives the fourth message 316 from the base station.

In some instances, it may be beneficial to reduce the response delay resulting from the above described random access procedure, including the three delay periods. Aspects of the present disclosure include a random access procedure that reduces the number of steps compared to the procedure described above with reference to FIGS. 3 and 4.

Figure 5:
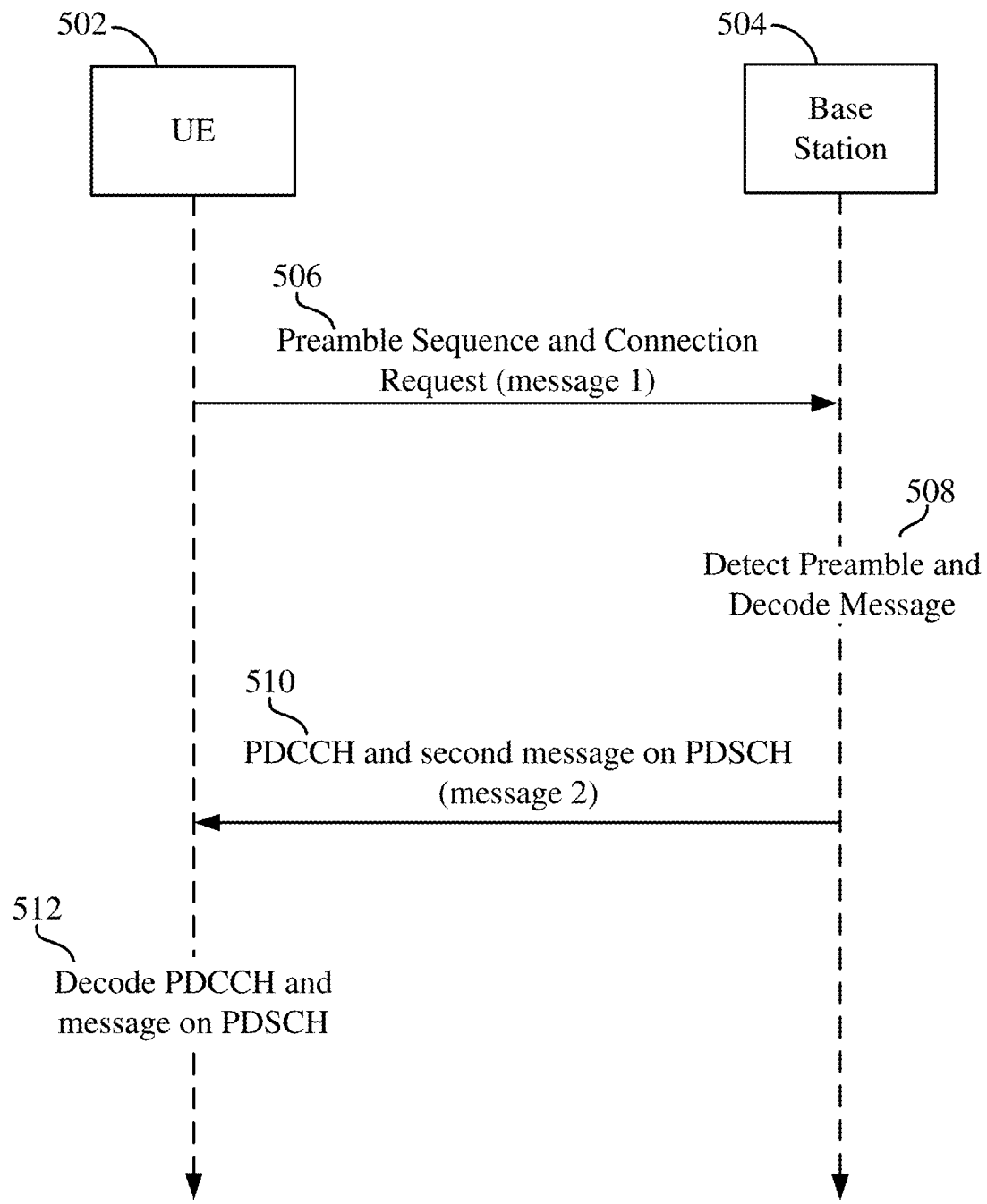
FIG. 5 is a flow diagram illustrating an example of a random access procedure employing two transmissions according to at least one implementation.

Referring now to FIG. 5, a flow diagram is shown depicting a random access procedure according to one or more aspects of the present disclosure. In this example, a UE 502 is shown communicating with a base station 504. It should be understood that aspects of the disclosure can be employed between a scheduled entity (e.g. UE 502) and a scheduling entity (e.g., base station 504). As shown, the UE 502 randomly selects a PRACH preamble sequence from a set of available preamble sequences and sends a first message 506 on the PRACH at increasing power until the base station 304 detects the preamble. In this example, the first message 506 can include at least some of the information included in the first message 306 and third message 310 from the example in FIG. 3. For instance, in addition to including the PRACH preamble sequence, the first message 506 can include a RACH message. According to at least one implementation, the RACH message may include an identity of the UE 502 (UE ID), a channel flag, a buffer status report (BSR), scheduling request (SR), and/or other information.

When the base station 504 receives the first message 506, the base station 504 detects the preamble and decodes the RACH message at step 508. In response to successfully detecting the preamble and decoding the RACH message, the base station 504 can send a second message 510 to the UE 502 that includes a transmission on the PDCCH and a message transmitted on the PDSCH. The PDCCH in the second transmission 510 may include CRC bits that are scrambled with a UE-specific network identifier (e.g., RNTI). The message transmitted on the PDSCH may include UE-specific content, such as an indication confirming the PRACH preamble, a timing advance value, a back-off indicator, a contention resolution message, a transmit power control (TPC) command, an uplink or downlink resource grant, and/or other information.

On receipt of the second message 510, the UE 502 attempts to decode the PDCCH and the message on the PDSCH at step 512. If the UE 502 successfully decodes both the PDCCH and the message on the PDSCH, then the UE 502 can send an ACK to the base station 504. If the UE 502 fails to decode the PDCCH, then the UE 502 can operate as if the first message 506 was not successfully received by the base station 504, and can retransmit the first message 506 with power ramping and/or random timing. On the other hand, if the UE 502 successfully decodes the PDCCH, but does not successfully decode the message on the PDSCH, then the UE 502 can transmit a NACK to the base station 504, which can cause the base station 504 to retransmit the message.

Figure 6:
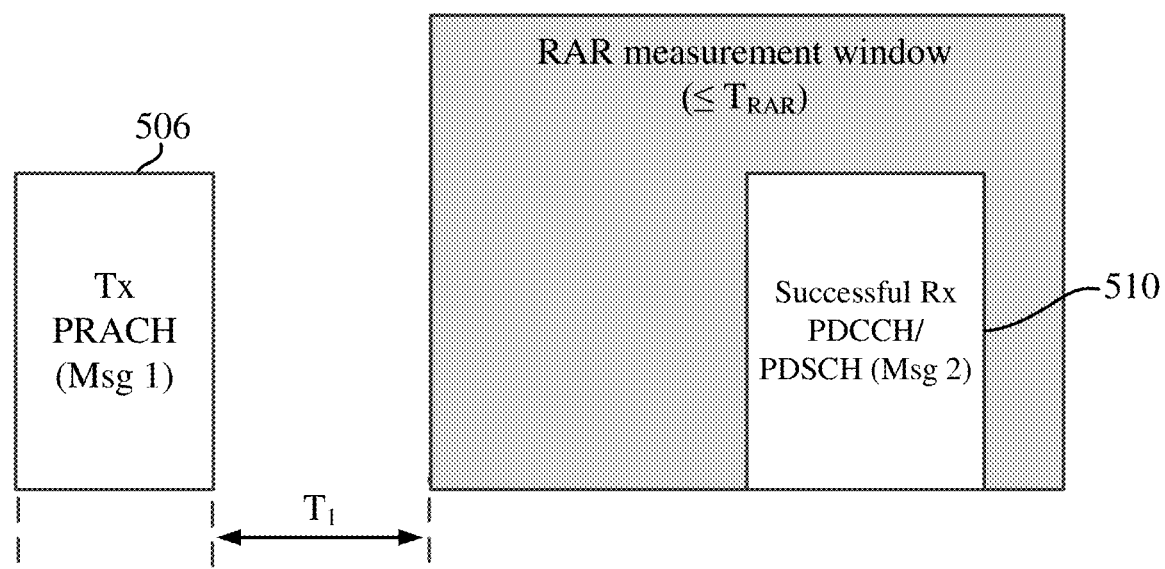
FIG. 6 is a block diagram illustrating an example of delay periods in the random access procedure of FIG. 5.

Employing the random access procedure described above including just two transmissions instead of four can reduce the time associated with the random access procedure. FIG. 6 is a block diagram depicting the two-step random access procedure of FIG. 5. As shown, the first delay period $T_1$ following transmission of the first message 506 until the UE 502 opens a RAR measurement window to monitor for the second message 510 sent from the base station 504 can be the same as the first delay period $T_1$ in FIG. 4. Following successful reception and decoding of the second message 510, the UE 502 may transmit an ACK or NACK after a second delay period that may be similar to the delay period $T_2$ in FIG. 4 when the UE 502 employs the timing indicated by the second message 510. A timing adjustment may be performed when the UE 502 transmits the ACK or NACK, where the timing adjustment is in accordance with a timing advance value included in the received second message 510.

In the example described above with reference to FIG. 3, the UE initially utilizes a RA-RNTI for the first and second messages. In the procedure described above with reference to FIG. 5, the UE and base station can utilize a unique network identifier, or at least substantially unique network identifier associated with the UE (e.g., RNTI), for the ability to send a NACK when it is able to decode the PDCCH without decoding the message on the PDSCH, and to receive a retransmission of the message on the PDSCH. In at least one implementation, the UE 502 and base station 504 may generate a device-specific network identifier associated with the UE (e.g., TC-RNTI) based on an identity of the UE (UE ID). For example, the UE and base station may employ a predetermined number of bits of the UE identity (UE ID) as the device-specific network identifier (e.g., TC-RNTI) or to derive the device-specific network identifier. Referring again to FIG. 5, when the UE 502 includes the UE ID, or at least a portion of the UE ID, in the first message 506, the base station 504 can determine from the UE ID a device-specific network identifier (e.g., TC-RNTI) in the same manner that the UE 502 determines a device-specific network identifier (e.g., TC-RNTI) from the UE ID. In this way, both entities are aware of the device-specific network identifier (e.g., TC-RNTI) to be associated with the UE 502.

In at least one other implementation, the UE 502 and base station 504 can generate the device-specific network identifier (e.g., TC-RNTI) based on information associated with the resources utilized to send the first message 506. For example, the resources utilized to send the first message 506 may include the transmission time, the frequency, the preamble sequence (e.g., the root, shifts), etc. The UE 502 and the base station 504 may employ information associated with one or more of these resource parameters to generate the device-specific network identifier (TC-RNTI) to be employed by the UE 502 as part of the random access procedure.

In yet another implementation, the UE 502 and base station 504 can generate a UE-specific network identifier (e.g., TC-RNTI) based on a combination of at least a portion of the UE ID and one or more parameters associated with the resources selected for sending the first message 506. For instance, the UE-specific network identifier (e.g., TC-RNTI) may be generated by mapping at least a portion of the UE ID and one or more parameters associated with the resources selected for sending the first message 506. In such implementations, the resources for sending the first message 506 may be selected randomly, similar to the example described with reference to FIG. 3. Alternatively, such implementations may include the one or more parameters for transmitting the first message 506 being selected based on a predetermined number of bits from the UE ID. Additional bits of the UE ID may also be transmitted in the first message 506. Utilizing both the UE ID payload and one or more parameters associated with the resources utilized for sending the first message 506, the UE 502 and base station 504 can map a UE-specific network identifier (e.g., TC-RNTI) that is unique to the UE 502.

With a unique or substantially unique network identifier (e.g., TC-RNTI), the PDCCH for the second message 510 may be transmitted in either common search space or UE-specific search space of the PDCCH. Further, if the second message 510 is retransmitted in response to a NACK sent by the UE 502 to the base station 504, the UE 502 can combine the new transmission with the previous transmission to improve performance. That is, the UE 502 can receive the first transmission of the second message 510 and save in memory the message on the PDSCH received in that first transmission of the second message 510, even though the UE 502 was unable to decode the message (e.g., the CRC fails in the first transmission). The UE 502 can then receive a second transmission of the message on the PDSCH of the second message 510 and can combine the message on the PDSCH in the second transmission with the message that was stored from the first transmission to improve the decoding of the second message 510 at the UE 510.

According to aspects of the present disclosure, when the base station 504 transmits the second message 510, but receives a retransmission of the first message 506, the base station 504 is informed that the UE 502 failed to decode the PDCCH. In response, the base station 504 may retransmit the PDCCH with increased resources or a lower coding rate.

Figure 7:
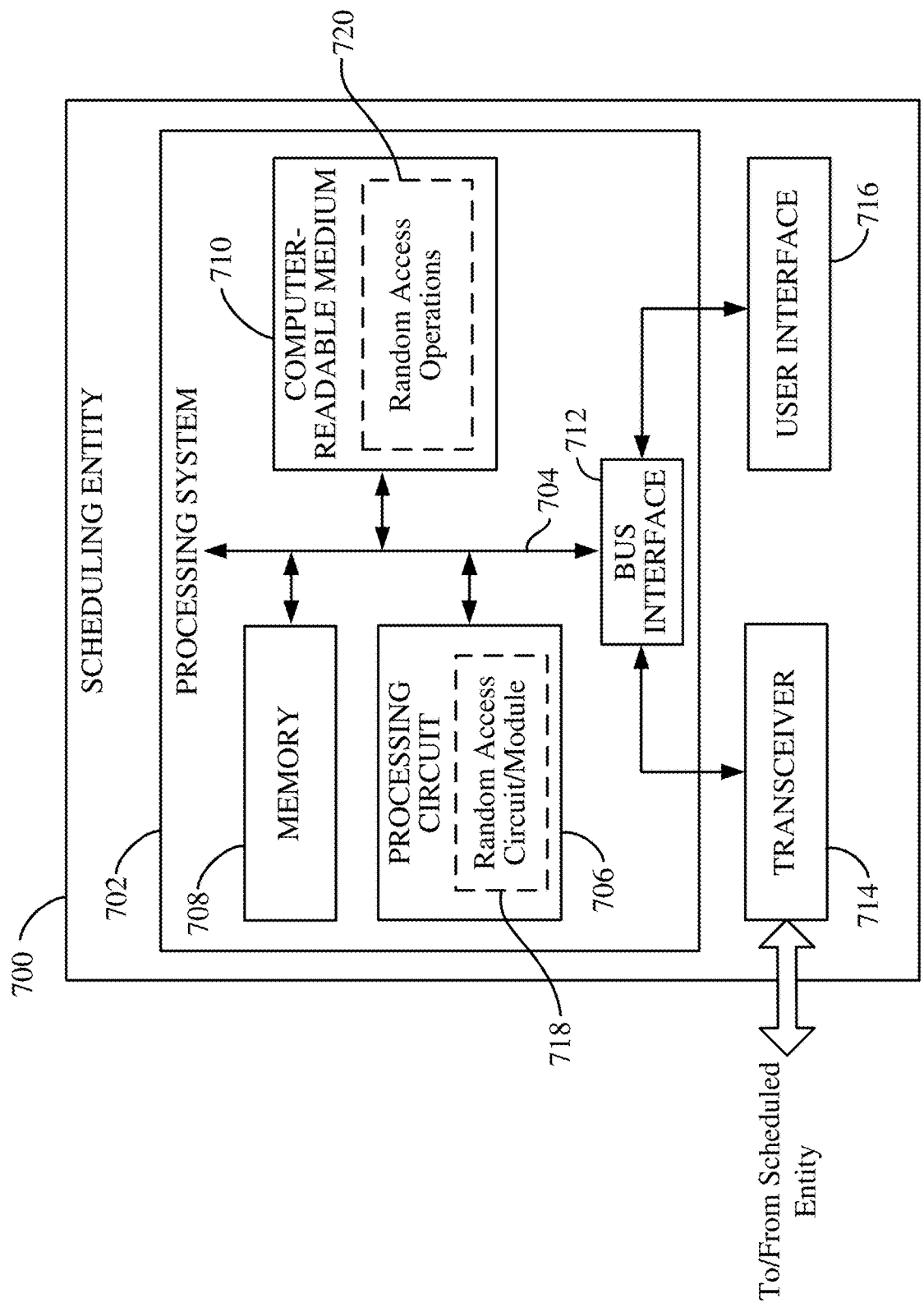
FIG. 7 is a block diagram illustrating select components of a scheduling entity according to at least one example.

According to aspects of the present disclosure, scheduling entities and scheduled entities are adapted to facilitate the two-step random access procedure described herein. FIG. 7 is a block diagram illustrating select components of a scheduling entity 700 employing a processing system 702 according to at least one example of the present disclosure. In this example, the processing system 702 is implemented with a bus architecture, represented generally by the bus 704. The bus 704 may include any number of interconnecting buses and bridges depending on the specific application of the processing system 702 and the overall design constraints. The bus 704 communicatively couples together various circuits including one or more processors (represented generally by the processing circuit 706), a memory 708, and computer-readable media (represented generally by the storage medium 710). The bus 704 may also link various other circuits such as timing sources, peripherals, voltage regulators, and power management circuits, which are well known in the art, and therefore, will not be described any further. A bus interface 712 provides an interface between the bus 704 and a transceiver 714. The transceiver 714 provides a means for communicating with various other apparatus over a transmission medium. Depending upon the nature of the apparatus, a user interface 716 (e.g., keypad, display, speaker, microphone, joystick) may also be provided.

The processing circuit 706 is responsible for managing the bus 704 and general processing, including the execution of programming stored on the computer-readable storage medium 710. The programming, when executed by the processing circuit 706, causes the processing system 702 to perform the various functions described below for any particular apparatus. The computer-readable storage medium 710 and the memory 708 may also be used for storing data that is manipulated by the processing circuit 706 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 706 is arranged to obtain, process and/or send data, control data access and storage, issue commands, and control other desired operations. The processing circuit 706 may include circuitry adapted to implement desired programming provided by appropriate media, and/or circuitry adapted to perform one or more functions described in this disclosure. For example, the processing circuit 706 may be implemented as one or more processors, one or more controllers, and/or other structure configured to execute executable programming and/or execute specific functions. Examples of the processing circuit 706 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 706 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 706 are for illustration and other suitable configurations within the scope of the present disclosure are also contemplated.

In some instances, the processing circuit 706 may include a random access circuit and/or module 718. The random access circuit/module 718 may generally include circuitry and/or programming (e.g., programming stored on the storage medium 710) adapted to perform a random access procedure at a scheduling entity according to one or more of the aspects for a two-step random access procedure described herein. As used herein, reference to circuitry and/or programming may be generally referred to as logic (e.g., logic gates and/or data structure logic).

The storage medium 710 may represent one or more computer-readable devices for storing programming, such as processor executable code or instructions (e.g., software, firmware), electronic data, databases, or other digital information. The storage medium 710 may also be used for storing data that is manipulated by the processing circuit 706 when executing programming. The storage medium 710 may be any available non-transitory media that can be accessed by a general purpose or special purpose processor, including portable or fixed storage devices, optical storage devices, and various other mediums capable of storing, containing and/or carrying programming By way of example and not limitation, the storage medium 710 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 710 may be coupled to the processing circuit 706 such that the processing circuit 706 can read information from, and write information to, the storage medium 710. That is, the storage medium 710 can be coupled to the processing circuit 706 so that the storage medium 710 is at least accessible by the processing circuit 706, including examples where the storage medium 710 is integral to the processing circuit 706 and/or examples where the storage medium 710 is separate from the processing circuit 706 (e.g., resident in the processing system 702, external to the processing system 702, distributed across multiple entities).

Programming stored by the storage medium 710, when executed by the processing circuit 706, can cause the processing circuit 706 to perform one or more of the various functions and/or process steps described herein. In at least some examples, the storage medium 710 may include random access operations 720. The random access operations 720 are generally adapted to cause the processing circuit 706 to perform a random access procedure according to one or more of the aspects of a two-step random access procedure described herein.

Thus, according to one or more aspects of the present disclosure, the processing circuit 706 for scheduling entity 700 is adapted to perform (independently or in conjunction with the storage medium 710) any or all of the processes, functions, steps and/or routines for any or all of the scheduling entities described herein (e.g., base station 110, 112, 114, 118, 504, UE 138, quadcopter 120, scheduling entity 202). As used herein, the term "adapted" in relation to the processing circuit 706 may refer to the processing circuit 706 being one or more of configured, employed, implemented, and/or programmed (in conjunction with the storage medium 710) to perform a particular process, function, step and/or routine according to various features described herein.

Figure 8:
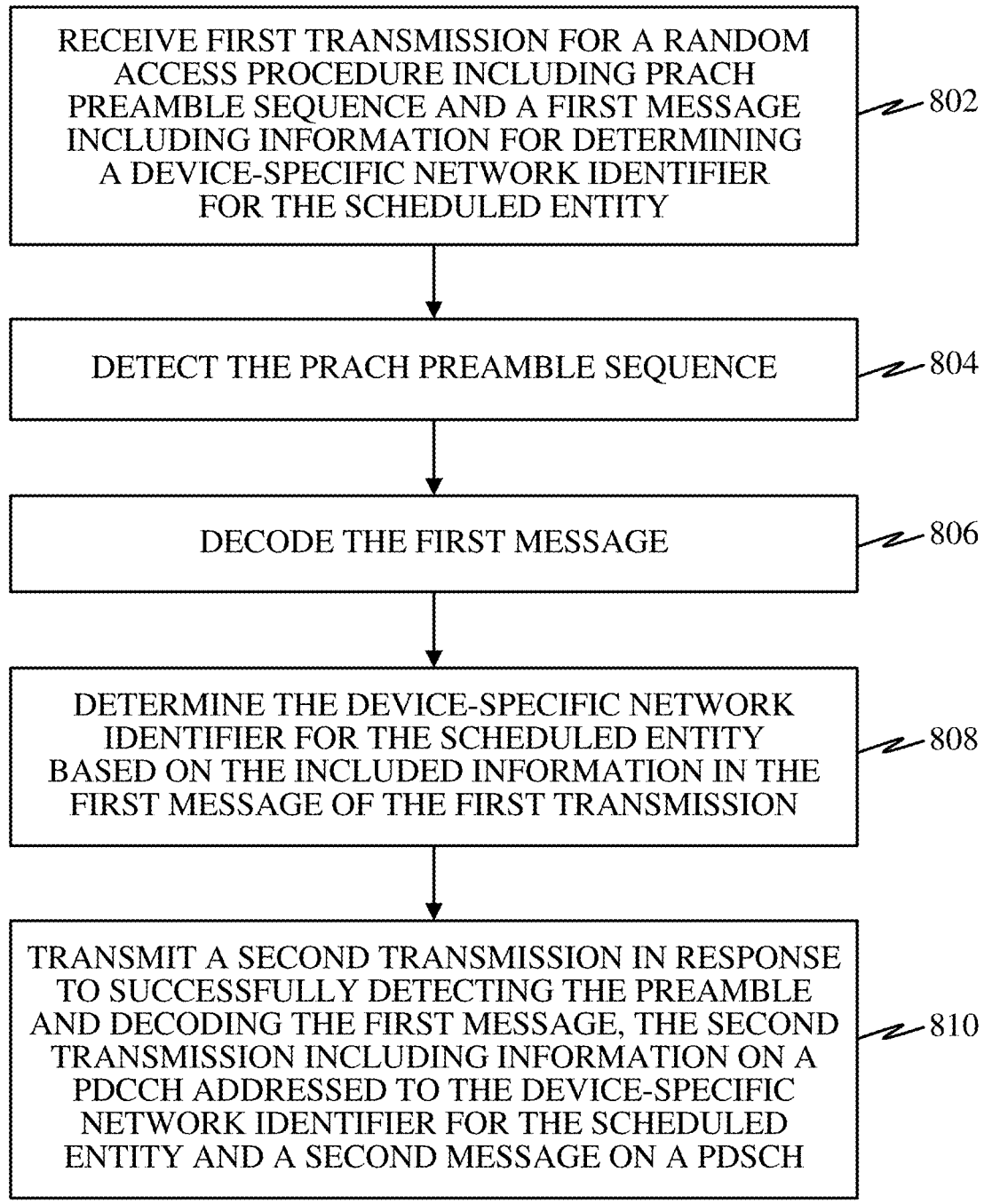
FIG. 8 is a flow diagram illustrating a method operational on a scheduling entity according to at least one example.

FIG. 8 is a flow diagram illustrating a method operational on a scheduling entity, such as the scheduling entity 700, according to at least one example. With reference to FIGS. 7 and 8, the scheduling entity 700 may receive a first transmission from a scheduled entity for a random access procedure, at 802. For example, the processing circuit 706 may include logic (e.g., random access circuit/module 718, random access operations 720) to receive a first transmission via the transceiver 714 from a scheduled entity for a random access procedure. The received first transmission may include a PRACH preamble sequence and a first message including information for determining a device-specific network identifier for the scheduled entity. In one or more examples, the first message may further include a channel flag, a buffer status report (BSR), a scheduling request (SR), and/or other information.

In at least one example, the information for determining the device-specific network identifier may include the UE identity (UE ID) for the scheduled entity. In at least one other example, the information for determining the device-specific network identifier may include one or more parameters associated with the resources utilized to send the first transmission. In yet another example, the information for determining the device-specific network identifier may include a combination of at least a portion of the UE identity (UE ID) and one or more parameters associated with the resources selected for sending the first transmission.

At 804, the scheduling entity 700 may detect the PRACH preamble sequence in the first transmission. For example, the processing circuit 706 may include logic (e.g., random access circuit/module 718, random access operations 720) to detect the PRACH preamble sequence in the first transmission.

At 806, the scheduling entity 700 may decode the received first message. For example, the processing circuit 706 may include logic (e.g., random access circuit/module 718, random access operations 720) to decode the received first message including the information for determining the device-specific network identifier for the scheduled entity.

At 808, the scheduling entity 700 may determine the device-specific network identifier for the scheduled entity based on the included information in the first message of the first transmission. For example, the processing circuit 706 may include logic (e.g., random access circuit/module 718, random access operations 720) to determine the device-specific network identifier (e.g., TC-RNTI) based on the information for determining the device-specific network identifier included in the first transmission.

As stated above, the information for determining the device-specific network identifier may include the UE identity (UE ID) for the scheduled entity. In such an implementation, the processing circuit 706 may include logic (e.g., random access circuit/module 718, random access operations 720) to determine the device-specific network identifier (e.g., TC-RNTI) based on at least a portion of the received UE identity (UE ID). For example, the processing circuit 706 may include logic (e.g., random access circuit/module 718, random access operations 720) to employ a predetermined number of bits of the UE identity (UE ID) as the device-specific network identifier (e.g., TC-RNTI) or to derive the device-specific network identifier.

In another example, the information for determining the device-specific network identifier may include one or more parameters associated with the resources utilized to send the first transmission. For example, the resources utilized to send the first transmission may include the transmission time, the frequency, the preamble sequence (e.g., the root, shifts), etc. The processing circuit 706 may include logic (e.g., random access circuit/module 718, random access operations 720) to employ information associated with one or more of these resource parameters to determine the device-specific network identifier (e.g., TC-RNTI).

In yet another example, the information for determining the device-specific network identifier may include a combination of at least a portion of the UE identity (UE ID) and one or more parameters associated with the resources selected for sending the first transmission. For example, the processing circuit 706 may include logic (e.g., random access circuit/module 718, random access operations 720) to determine the UE-specific network identifier (e.g., TC-RNTI) by mapping at least a portion of the UE ID and one or more parameters associated with the resources selected for sending the first transmission. Utilizing both the UE identity (UE ID) and one or more parameters associated with the resources utilized for sending the first transmission, the scheduling entity 700 can map a UE-specific network identifier (e.g., TC-RNTI) that is unique to the scheduled entity.

In response to successfully detecting the PRACH preamble and decoding the first message in the first transmission, the scheduling entity 700 may transmit a second transmission including information on a PDCCH addressed to the device-specific network identifier for the scheduled entity, and a second message on a PDSCH, at 810. For example, the processing circuit 706 may include logic (e.g., random access circuit/module 718, random access operations 720) to transmit the second transmission via the transceiver 714, including information on a PDCCH addressed to the device-specific network identifier for the scheduled entity, and a second message on the PDSCH. The second transmission may be sent in a common search space or a device-specific search space of the PDCCH.

In at least one example, the information on the PDCCH may be addressed to the device-specific network identifier by including CRC bits that are scrambled with the UE-specific network identifier. The second message transmitted on the PDSCH may include content specific to the scheduled entity, such as an indication confirming the PRACH preamble, a timing advance value, a back-off indicator, a contention resolution message, a transmit power control (TPC) command, an uplink or downlink resource grant, and/or other information.

In some implementations, the scheduling entity 700 may receive a retransmission of the first transmission from the scheduled entity after the scheduling entity 700 has sent the second transmission. In such instances, the scheduling entity 700 may transmit the second transmission a second time utilizing at least one of increased resources or a lower coding rate for the PDCCH. For example, the processing circuit 706 may include logic (e.g., random access circuit/module 718, random access operations 720) to send the second transmission a second time with increased resources or a lower coding rate for the PDCCH in response to receiving the first transmission from the scheduled entity after previously sending the second transmission.

Figure 9:
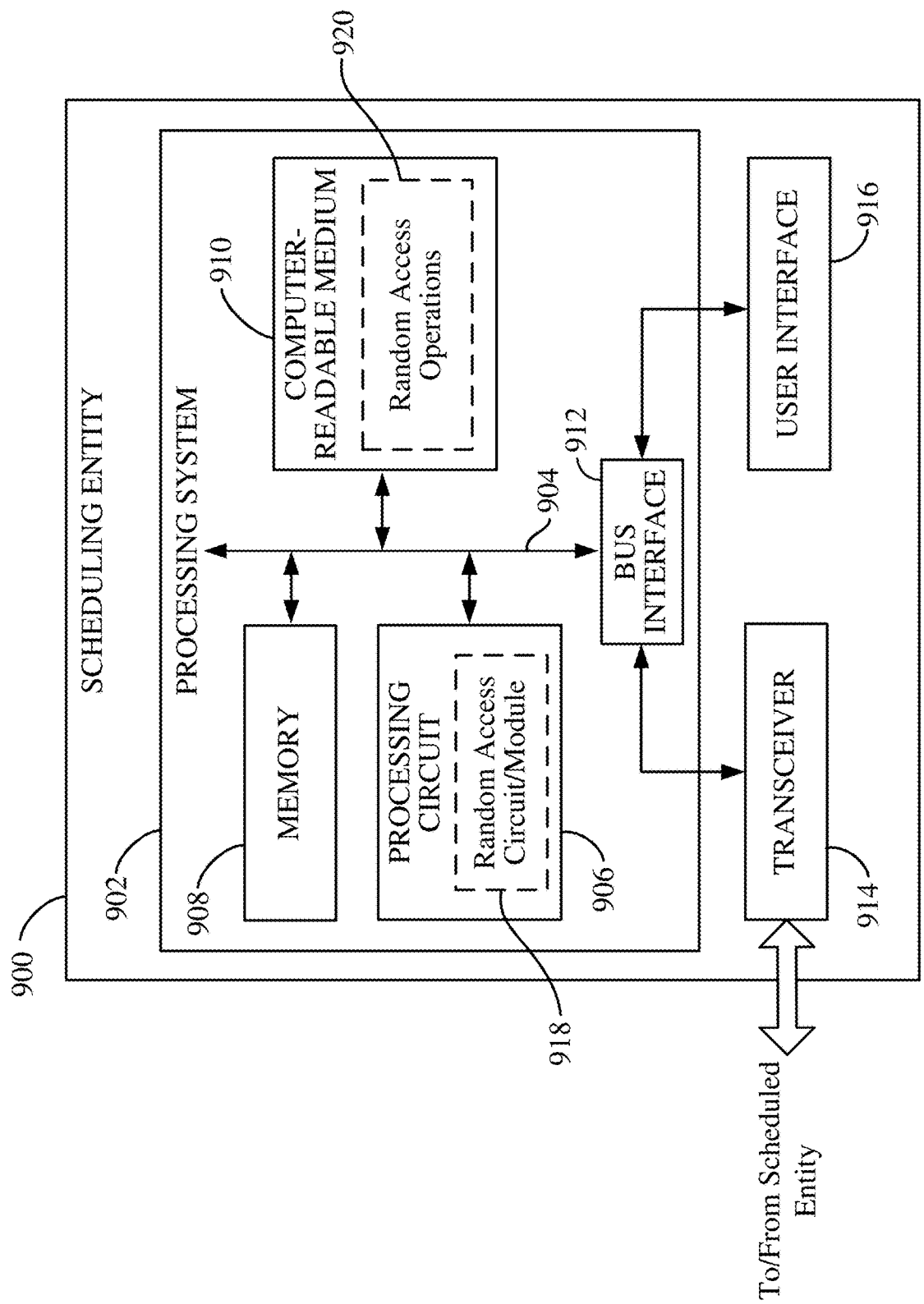
FIG. 9 is a block diagram illustrating select components of a scheduled entity according to at least one example.

Turing now to FIG. 9, a block diagram is depicted illustrating select components of a scheduled entity 900 employing a processing system 902 according to at least one example of the present disclosure. Similar to the processing system 702 in FIG. 7, the processing system 902 may be implemented with a bus architecture, represented generally by the bus 904. The bus 904 may include any number of interconnecting buses and bridges depending on the specific application of the processing system 902 and the overall design constraints. The bus 904 communicatively couples various circuits including one or more processors (represented generally by the processing circuit 906), a memory 908, and computer-readable media (represented generally by the storage medium 910). The bus 904 may also link various other circuits such as timing sources, peripherals, voltage regulators, and power management circuits, which are well known in the art, and therefore, will not be described any further. A bus interface 912 provides an interface between the bus 904 and a transceiver 914. The transceiver 914 provides a means for communicating with various other apparatus over a transmission medium. Depending upon the nature of the apparatus, a user interface 916 (e.g., keypad, display, speaker, microphone, joystick) may also be provided.

The processing circuit 906 is responsible for managing the bus 904 and general processing, including the execution of programming stored on the computer-readable storage medium 910. The programming, when executed by the processing circuit 906, causes the processing system 902 to perform the various functions described below for any particular apparatus. The computer-readable storage medium 910 and the memory 908 may also be used for storing data that is manipulated by the processing circuit 906 when executing programming.

The processing circuit 906 is arranged to obtain, process and/or send data, control data access and storage, issue commands, and control other desired operations. The processing circuit 906 may include circuitry adapted to implement desired programming provided by appropriate media in at least one example, and/or circuitry adapted to perform one or more functions described in this disclosure. The processing circuit 906 may be implemented and/or configured according to any of the examples of the processing circuit 706 described above.

In some instances, the processing circuit 906 may include a random access circuit and/or module 918. The random access circuit/module 918 may generally include circuitry and/or programming (e.g., programming stored on the storage medium 910) adapted to perform a random access procedure at a scheduled entity according to one or more of the aspects for a two-step random access procedure described herein. As noted previously, reference to circuitry and/or programming may be generally referred to as logic (e.g., logic gates and/or data structure logic).

The storage medium 910 may represent one or more computer-readable devices for storing programming, such as processor executable code or instructions (e.g., software, firmware), electronic data, databases, or other digital information. The storage medium 910 may be configured and/or implemented in a manner similar to the storage medium 710 described above.

Programming stored by the storage medium 910, when executed by the processing circuit 906, can cause the processing circuit 906 to perform one or more of the various functions and/or process steps described herein. In at least some examples, the storage medium 910 may include random access operations 920 adapted to cause the processing circuit 906 to perform a random access procedure for a scheduled entity according to one or more of the aspects for a two-step random access procedure described herein. Thus, according to one or more aspects of the present disclosure, the processing circuit 906 is adapted to perform (independently or in conjunction with the storage medium 910) any or all of the processes, functions, steps and/or routines for any or all of the scheduled entities described herein (e.g., UE 122, 124, 126, 128, 130, 132, 134, 136, 138, 140, 142, and 502, scheduled entity 204, scheduled entity 900). As used herein, the term "adapted" in relation to the processing circuit 906 may refer to the processing circuit 906 being one or more of configured, employed, implemented, and/or programmed (in conjunction with the storage medium 910) to perform a particular process, function, step and/or routine according to various features described herein.

Figure 10:
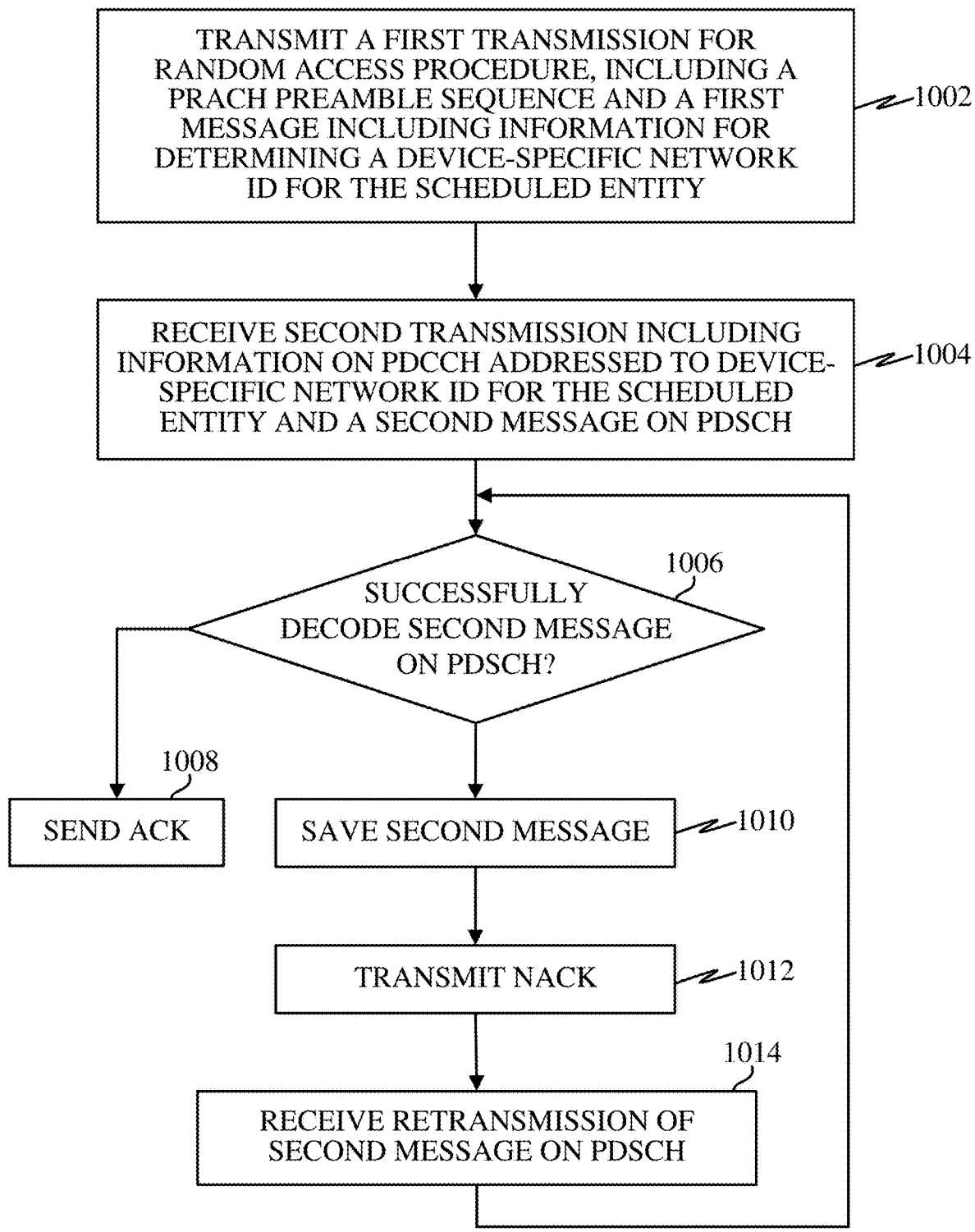
FIG. 10 is a flow diagram illustrating a method operational on a scheduled entity according to at least one example.

FIG. 10 is a flow diagram illustrating a method operational on a scheduled entity, such as the scheduled entity 900, according to at least one example. With reference to FIGS. 9 and 10, the scheduled entity 900 may transmit a first transmission for a random access procedure at 1002. For example, the processing circuit 906 may include logic (e.g., random access circuit/module 918, random access operations 920) to send the first transmission via the transceiver 914. The first transmission may include a PRACH preamble sequence and a first message including information for determining a devices-specific network identifier for the scheduled entity 900. In some examples, the first message may further include a channel flag, a buffer status report (BSR), a scheduling request (SR), and/or other information.

In at least one example, the information for determining the device-specific network identifier may include the UE identity (UE ID) for the scheduled entity. In at least one other example, the information for determining the device-specific network identifier may include one or more parameters associated with the resources utilized to send the first transmission. In yet another example, the information for determining the device-specific network identifier may include a combination of at least a portion of the UE identity (UE ID) and one or more parameters associated with the resources selected for sending the first transmission.

At 1004, the scheduled entity 900 may receive a second transmission including a PDCCH addressed to the device-specific network identifier for the scheduled entity 900 and a second message on a PDSCH. For example, the processing circuit 906 may include logic (e.g., random access circuit/module 918, random access operations 920) to receive the second transmission via the transceiver 914. In some examples, the information on the PDCCH may include a CRC scrambled by the device-specific network identifier for the scheduled entity. In some examples, the second transmission may be received in either a common search space or a device-specific search space of the PDCCH. Further, the second message on the PDSCH may include on or more of an indication confirming the PRACH preamble, a timing advance value, a back-off indicator, a contention resolution message, a transmit power control (TPC) command, an uplink resource grant, a downlink resource grant, and/or other information.

At 1006, the scheduled entity 900 attempts to decode the second message on the PDSCH. For example, the processing circuit 906 may include logic (e.g., random access circuit/module 918, random access operations 920) to decode the received second message on the PDSCH. If the scheduled entity 900 is successful in decoding the second message, the scheduled entity 900 may send an ACK to the scheduling entity at 1008.

On the other hand, if the scheduled entity 900 is not able to successfully decode the second message (e.g., the CRC fails), the scheduled entity 900 can save the second message at 1010 and can transmit an NACK at 1012. For example, the processing circuit 906 may include logic (e.g., random access circuit/module 918, random access operations 920) to save the second message to the memory 908 or to the storage medium 910. Further, the processing circuit 906 may include logic (e.g., random access circuit/module 918, random access operations 920) to transmit a NACK via the transceiver 914 to the scheduling entity.

In response to the NACK, the scheduled entity 900 may receive a retransmission of the second message on the PDSCH at 1014. With the retransmission of the second message, the scheduled entity 900 can once again attempt to decode the second message at 1006. In some implementations, the scheduled entity 900 utilize the previously received and saved second message and the retransmitted second message to decode the second message. For example, the processing circuit 906 may include logic (e.g., random access circuit/module 918, random access operations 920) to combine the new transmission with the previous transmission to improve the decoding of the second message. An example of combining the previous transmission with the new transmission may include summing up the new transmission with the previous transmission that is saved before passing the transmission for decoding. By way of example, a summing up of the two transmissions may be performed utilizing a simple maximum ratio combining (MRC) technique.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, 9, and/or 10 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 7, and/or 9 may be configured to perform or employ one or more of the methods, features, parameters, and/or steps described in FIGS. 3, 4, 5, 6, 8, and/or 10. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A base station, comprising:
    a transceiver;
    a memory; and
    one or more processors coupled to the transceiver and the memory, the one or more processors configured to:
    receive via the transceiver a first transmission from a user equipment (UE) for a random access procedure using a time-frequency resource, one or more parameters of the time-frequency resource being based on a first predetermined number of bits of a user equipment identity (UE ID) associated with the UE, the first transmission comprising a physical random access channel (PRACH) preamble sequence and a first message including at least a second predetermined number of bits of the UE ID;
    determine a temporary identifier associated with the UE based on the second predetermined number of bits of the UE ID and the one or more parameters of the time-frequency resource used to receive at least the PRACH preamble sequence;
    detect the PRACH preamble sequence;
    decode the first message; and
    in response to successfully detecting the PRACH preamble sequence and decoding the first message of the first transmission, transmit via the transceiver a second transmission including:
        information on a physical downlink control channel (PDCCH) addressed to the temporary identifier associated with UE, and
        a second message on a physical downlink shared channel (PDSCH) associated with the PDCCH,
        wherein the second message on the PDSCH comprises at least one of an indication confirming the PRACH preamble sequence, a timing advance value, a back-off indicator, a contention resolution message, a transmit power control (TPC) command, an uplink resource grant, or a downlink resource grant, specific to the UE.

2. The base station of claim 1, wherein the information on the PDCCH comprises a cyclic redundancy check (CRC) scrambled by the temporary identifier associated with the UE.

3. The base station of claim 1, wherein the one or more processors are further configured to send the information on the PDCCH in one of a common search space or a device-specific search space.

4. The base station of claim 1, wherein the one or more processors are further configured to:
    receive a retransmission of the first transmission after sending the second transmission; and
    retransmit the second transmission utilizing at least one of increased resources or a lower coding rate for the PDCCH.

5. The base station of claim 1, wherein the received first message further includes at least one of a channel flag, a buffer status report (BSR), or a scheduling request (SR).

6. A method of wireless communication at a base station, comprising:
    receiving a first transmission from a user equipment (UE) for a random access procedure using a time-frequency resource, one or more parameters of the time-frequency resource being based on a first predetermined number of bits of a user equipment identity (UE ID) associated with the UE, the first transmission comprising a physical random access channel (PRACH) preamble sequence and a first message including a second predetermined number of bits of the UE ID;
    determining a temporary identifier associated with the UE based on the second predetermined number of bits of the UE ID and the one or more parameters of the time-frequency resource used to receive at least the PRACH preamble sequence;
    detecting the PRACH preamble sequence;
    decoding the first message; and
    in response to successfully detecting the PRACH preamble sequence and decoding the first message of the first transmission, transmitting a second transmission including:
        information on a physical downlink control channel (PDCCH) addressed to the temporary identifier associated with the UE, and
        a second message on a physical downlink shared channel (PDSCH) associated with the PDCCH,
        wherein the second message on the PDSCH comprises at least one of an indication confirming the PRACH preamble sequence, a timing advance value, a back-off indicator, a contention resolution message, a transmit power control (TPC) command, an uplink resource grant, or a downlink resource grant, specific to the UE.

7. The method of claim 6, wherein transmitting the second transmission including information on the PDCCH addressed to the temporary identifier associated with the UE comprises:
   transmitting the PDCCH including a cyclic redundancy check (CRC) scrambled by the temporary identifier associated with the UE.

8. The method of claim 6, wherein transmitting the second transmission including information on the PDCCH comprises:
   transmitting the second transmission including information on the PDCCH in one of a common search space or a device-specific search space.

9. The method of claim 6, further comprising:
   after transmitting the second transmission, receiving a retransmission of the first transmission; and
   transmitting the second transmission a second time utilizing at least one of increased resources or a lower coding rate for the PDCCH.

10. A user equipment (UE), comprising:
    a transceiver;
    a memory; and
    one or more processors coupled to the transceiver and the memory, the one or more processors configured to:
    select a physical random access channel (PRACH) preamble sequence from a set of available preamble sequences;
    select one or more parameters of a time-frequency resource based on a first predetermined number of bits of a user equipment identity (UE ID) associated with the UE;
    include a second predetermined number of bits of the UE ID in a first message;
    transmit via the transceiver a first transmission for a random access procedure using the time-frequency resource, the first transmission comprising the selected PRACH preamble sequence and the first message; and
    receive via the transceiver a second transmission including:
       information on a physical downlink control channel (PDCCH) addressed to a temporary identifier associated with the UE based on the second predetermined number of bits of the UE ID and the one or more parameters of the time-frequency resource, and
       a second message on a physical downlink shared channel (PDSCH) associated with the PDCCH,
       wherein the second message comprises at least one of an indication confirming the PRACH preamble sequence, a timing advance value, a back-off indicator, a contention resolution message, a transmit power control (TPC) command, an uplink resource grant, or a downlink resource grant, specific to the UE.

11. The UE of claim 10, wherein the information on the PDCCH comprises a cyclic redundancy check (CRC) scrambled by the temporary identifier associated with the UE.

12. The UE of claim 10, wherein the one or more processors are further configured to:
    receive the information on the PDCCH in one of a common search space or a device-specific search space.

13. The UE of claim 10, wherein the one or more processors are further configured to:
    save the second message received on the PDSCH after failing to decode the second message;
    send a negative acknowledgement (NACK);
    receive a retransmission of the second message on the PDSCH; and
    utilize both the saved second message received on the PDSCH and the retransmitted second message on the PDSCH to decode the second message received on the PDSCH.

14. The UE of claim 10, wherein the transmitted first message further includes at least one of a channel flag, a buffer status report (BSR), or a scheduling request (SR).

15. A method of wireless communication at a user equipment (UE), comprising:
    selecting a physical random access channel (PRACH) preamble sequence from a set of available preamble sequences;
    selecting one or more parameters of a time-frequency resource based on a first predetermined number of bits of a user equipment identity (UE ID) associated with the UE;
    including a second predetermined number of bits of the UE ID in a first message;
    transmitting a first transmission for a random access procedure using the time-frequency resource, the first transmission comprising the selected PRACH preamble sequence and the first message; and
    receiving a second transmission including:
       information on a physical downlink control channel (PDCCH) addressed to a temporary identifier associated with the UE based on the second predetermined number of bits of the UE ID and the one or more parameters of the time-frequency resource, and
       a second message on a physical downlink shared channel (PDSCH) associated with the PDCCH;
       wherein the second message comprises at least one of an indication confirming the PRACH preamble sequence, a timing advance value, a back-off indicator, a contention resolution message, a transmit power control (TPC) command, an uplink resource grant, or a downlink resource grant, specific to the UE.

16. The method of claim 15, wherein receiving the second transmission including the information on the PDCCH comprises:
    receiving a cyclic redundancy check (CRC) scrambled by the temporary identifier associated with the UE.

17. The method of claim 15, wherein receiving the second transmission including the information on the PDCCH comprises:
    receiving the second transmission including the information on the PDCCH in one of a common search space or a device-specific search space.

18. The method of claim 15, further comprising:
    failing to decode the second message on the PDSCH;
    saving the second message received on the PDSCH;
    sending a negative acknowledgement (NACK);
    receiving a retransmission of the second message on the PDSCH; and
    utilizing both the saved second message received on the PDSCH and the retransmitted second message on the PDSCH to decode the second message on the PDSCH.

19. The method of claim 15, wherein transmitting the first transmission comprising the first message comprises:
    transmitting the first transmission comprising the first message further including at least one of a channel flag, a buffer status report (BSR), or a scheduling request (SR).

20. The method of claim 15, wherein receiving the second transmission including the second message on the PDSCH comprises:

receiving the second transmission including the second message on the PDSCH comprising at least one of an indication confirming the PRACH preamble sequence, a timing advance value, a back-off indicator, a contention resolution message, a transmit power control (TPC) command, an uplink resource grant, or a downlink resource grant.

* * * * *